G. K. S. FERGUSON

ART OF PACKAGING FRUIT AND THE LIKE

June 16, 1931.

Re. 18,099

Original Filed Oct. 8, 1927 2 Sheets-Sheet 1

Inventor

G. K. S. Ferguson

By Seymour & Bright

Attorneys

G. K. S. FERGUSON

June 16, 1931. ART OF PACKAGING FRUIT AND THE LIKE Re. 18,099

Original Filed Oct. 8, 1927 2 Sheets-Sheet 2

Inventor

G. K. S. Ferguson

By Seymour & Bright

Attorneys

Reissued June 16, 1931 Re. 18,099

UNITED STATES PATENT OFFICE

GEORGE K. S. FERGUSON, OF NORTH EAST, PENNSYLVANIA

ART OF PACKAGING FRUIT AND THE LIKE

Original No. 1,732,264, dated October 22, 1929, Serial No. 224,860, filed October 8, 1927. Application for reissue filed September 3, 1930. Serial No. 479,562.

This invention relates to improvements in the art of packaging fruit and the like.

Heretofore, it has been proposed to pack receptacles containing perishable merchandise, such as fruit, in wooden crates having such construction that when the crates are packed side by side, air may enter between them and pass into the crates between the slats forming the sides of the same. Some attempts have also been made to use paper or straw board in the construction of the primary or main container, but these have been specially constructed and have not been such as to insure adequate ventilation at all times during transit or when stored.

An object of my invention is to utilize paper or straw board cartons having straight or flat walls so that said cartons may be packed or stored in close formation and thus caused to occupy the smallest possible space, and so that at the same time, the cartons shall have ventilating openings so located and of such size that adequate ventilation of a number of cartons arranged side by side and in superimposed relation will be provided, and so that comparatively slight relative movement of the cartons will not operate to close ventilating holes of abutting cartons.

With this and other objects in view, the invention consists in certain novel features as hereinafter set forth and pointed out in the claims.

Figure 2:
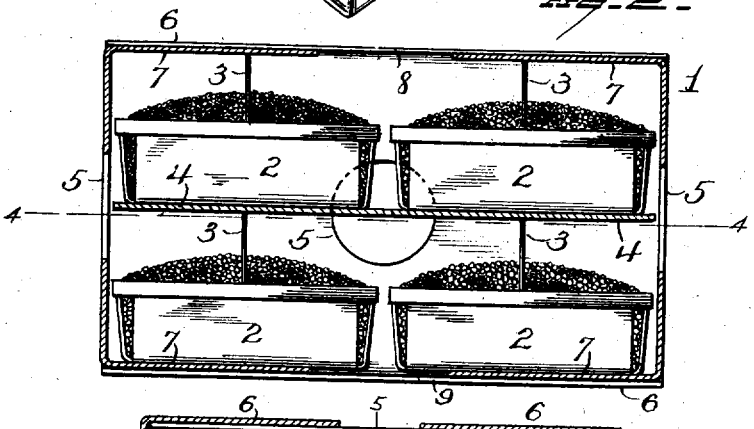
Figure 2 is a longitudinal sectional view of the same.
Figure 3:
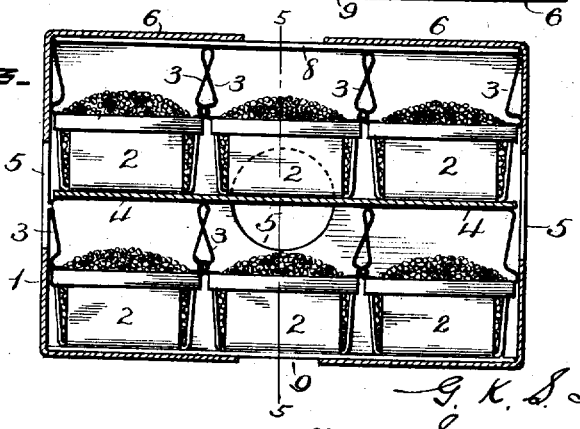
Figure 3 is a transverse sectional view.
Figure 4:
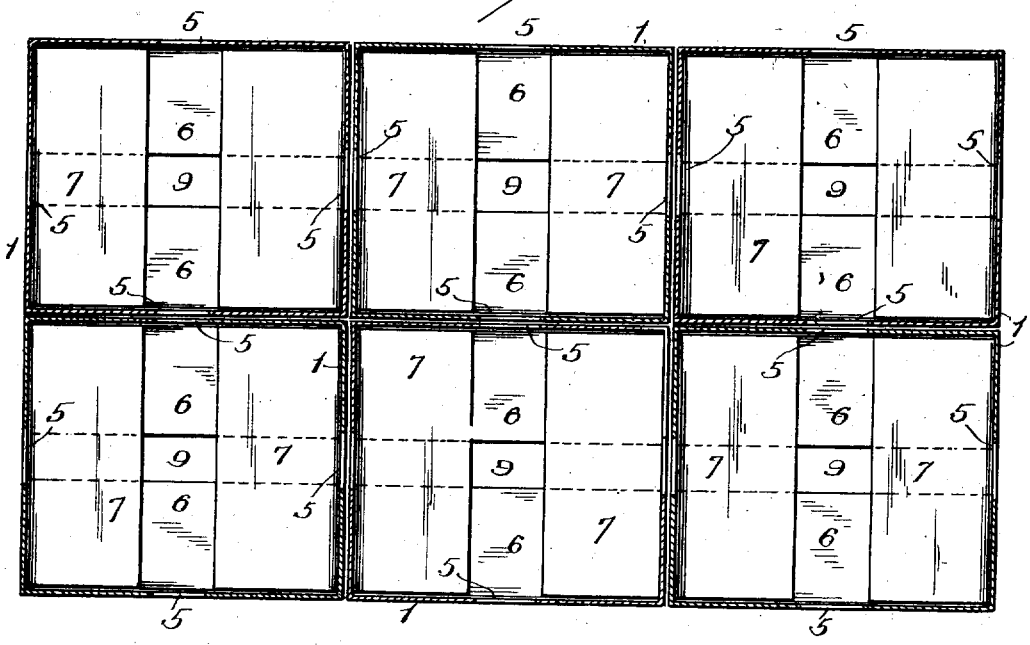
Figure 5:
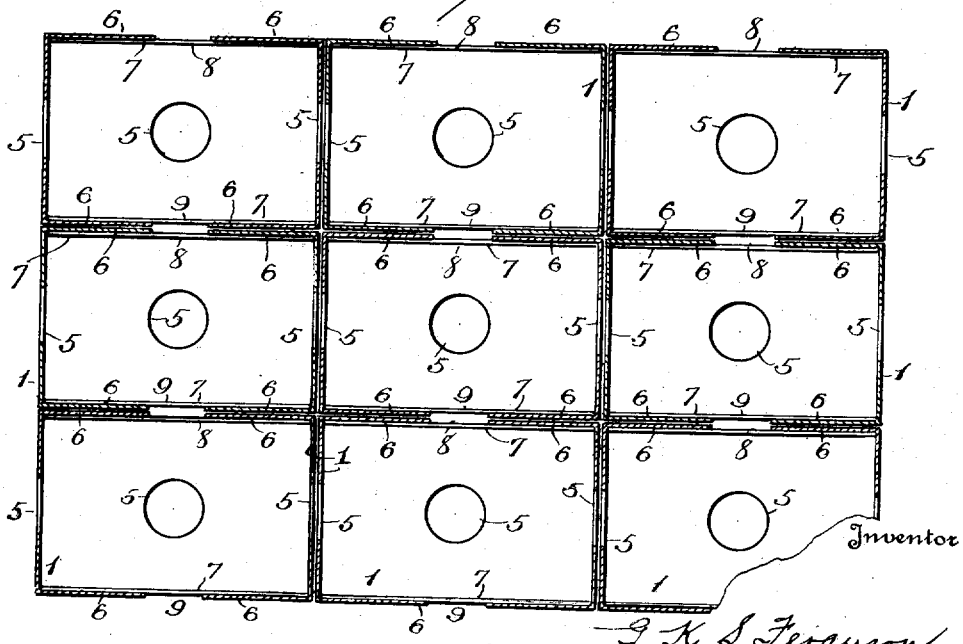

Figure 4 is a view showing a plurality of primary containers in horizontal section on a line corresponding with the line 4—4 of Figure 2, but with the baskets or secondary containers removed, and Figure 5 is a view of a plurality of containers disposed in vertical series, the containers being shown in section as indicated by the line 5—5 of Fig. 3, but with the baskets or secondary containers and the horizontal partitions removed.

Figure 1:
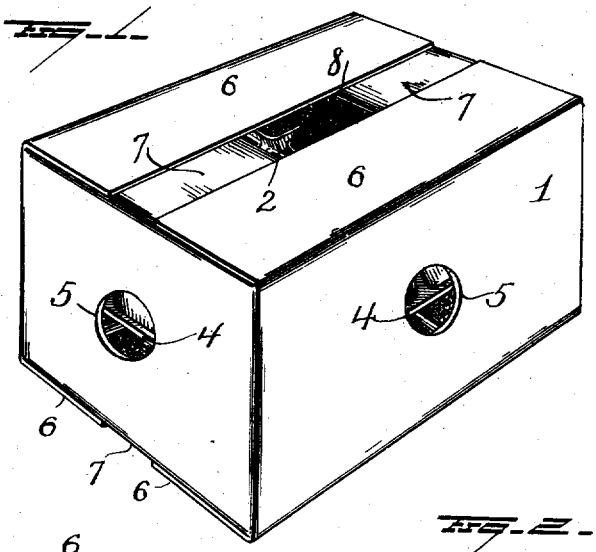
Figure 1 is a perspective view of one of the packages.

The pack or package, comprises a primary carton container 1, and a plurality of secondary containers 2 located within the primary container for fruit and the like. In Figures 1 to 3 of the drawings, the secondary or fruit containers 2 are shown as consisting of baskets having bails or handles 3 which may be so formed that the bails or handles of adjacent baskets may overlap when arranged within the carton or container as illustrated in Figure 3. The baskets are shown arranged in tiers, one above another, the upper tier of baskets being supported upon a horizontal platform or partition 4 supported upon the bails or handles of the lower series of baskets, and said platform or partition is sufficiently smaller than the internal dimensions of the carton as not to interfere with the circulation of air through the carton and the fruit contained in the baskets 2.

The carton 1 is made of paper or straw board or the like and the partition 4 may be made of the same material. The carton may be made in a single piece, as will be readily understood. Each vertical wall of the carton is provided centrally with an opening 5. Each central opening 5 is of considerable size, and being centrally located, each opening extends both above and below the partition 4. By locating the opening 5 centrally in the vertical walls of the carton, and making said opening of considerable size, the aligning of the openings in the vertical walls of one carton with similar openings in the vertical walls of cartons which may abut against the same at the sides and ends thereof, and free circulation of air horizontally throughout the interior of a closely packed series of cartons, will be assured, as will be apparent upon inspection of Figure 4 of the drawings, and furthermore, one carton may become displaced a considerable extent laterally with respect to adjacent cartons without stopping such circulation.

The top and bottom of the carton 1, each comprises a pair of flaps 6, 6, and a pair of flaps 7, 7, the flaps of one pair overlapping the flaps of the other pair and the pairs of top and bottom flaps are so proportioned that when in closed position, portions of their inner edges will define the walls of openings 8, 9 of considerable size centrally located in the top and bottom of the carton, and these openings will facilitate the circulation of air vertically through superimposed cartons, as will be apparent from an inspection of Figure 5. The openings 8 and 9 being of considerable size, alignment of such openings in cartons assembled in vertical series, will be insured, and considerable lateral displacement of one carton relatively to other cartons of the vertical series may occur without closing the circulation of air vertically through the vertical series of cartons.

My improvements insure adequate ventilation in two directions through closely packed cartons in which containers for fruit or the like are located; alignment of ventilating openings of the cartons will be insured, even when they are more or less carelessly assembled or piled.

Having fully described my invention, what I claim as new and desire to secure by Letters Patent is:—

1. Means for packaging fruit and the like, comprising a primary container consisting of a carton having flat sides, top and bottom, each provided with a central ventilating opening of substantial area, secondary containers arranged in tiers, within said carton, a horizontal partition separating one tier of containers from the next higher tier, said partition having its edges spaced from the sides of the carton and passing medially across the openings therein, whereby cartons may be packed closely to each other both in side by side and superimposed relation, and insure alignment of openings of one carton with openings in abutting cartons to effect adequate ventilation for the contents of a mass of closely packed cartons, and bails spanning the secondary containers for supporting the partition and the top of the carton in vertically spaced relation to the respectively subjacent containers.

2. Means for packaging fruit and the like, comprising a carton having central ventilating openings in each side, top and bottom, a plurality of containers arranged within the carton in vertical series of tiers, horizontal partitions between the tiers of containers, and upstanding bails on the several containers supporting the partitions and the top of the carton respectively in spaced relation to the respectively subjacent containers.

3. Means for packaging fruit and the like, comprising a primary carton formed of manufactured fibrous sheet material and having plane sides and a flat top and bottom, the top and bottom and each side being provided with a ventilating opening of substantial area, superposed tiers of secondary containers so arranged in said carton as to allow air circulation around the secondary containers and through said openings, a horizontal divider between the tiers of containers, and means on the several containers supporting the divider and the top of the carton respectively in spaced relation to the respectively subjacent containers.

4. Means for packaging fruit and the like, comprising a primary carton, a plurality of containers arranged within the carton in vertical series of tiers, a horizontal partition in the carton between the tiers of containers, and upstanding bails on the several containers supporting the partition and the top of the carton respectively in spaced relation to the respectively subjacent containers.

5. Means for packaging fruit and the like, comprising a carton having a ventilating opening of substantial size in each of its sides, a plurality of containers arranged within the carton in vertical series of tiers, a horizontal partition in the carton between the tiers of containers, and upstanding bails on the several containers supporting the partition and the top of the carton respectively in spaced relation to the respectively subjacent containers.

In testimony whereof, I hereto affix my signature.

GEO. K. S. FERGUSON.